(12) United States Patent
Elterman

(10) Patent No.: US 10,308,089 B2
(45) Date of Patent: Jun. 4, 2019

(54) BALL JOINT ASSEMBLY

(71) Applicant: Federal-Mogul Motorparts Corporation, Southfield, MI (US)

(72) Inventor: James Elterman, Bynes Mill, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 47 days.

(21) Appl. No.: 15/489,422

(22) Filed: Apr. 17, 2017

(65) Prior Publication Data

US 2018/0297429 A1    Oct. 18, 2018

(51) Int. Cl.
*B60G 7/00*   (2006.01)
*F16C 11/06*  (2006.01)

(52) U.S. Cl.
CPC .............. *B60G 7/005* (2013.01); *B60G 7/001* (2013.01); *F16C 11/0642* (2013.01); *F16C 11/0647* (2013.01); *F16C 11/0657* (2013.01); *F16C 11/0685* (2013.01); *B60G 2200/144* (2013.01); *B60G 2204/416* (2013.01); *F16C 2208/02* (2013.01); *F16C 2208/62* (2013.01); *F16C 2220/04* (2013.01); *F16C 2326/05* (2013.01)

(58) Field of Classification Search
CPC .............. B60G 7/005; B60G 2204/416; F16C 11/0685; F16C 11/08
See application file for complete search history.

(56) References Cited

U.S. PATENT DOCUMENTS

| 2,936,188 | A  | * | 5/1960  | Moskovitz | B60G 7/005 403/139 |
| 3,305,617 | A  | * | 2/1967  | Dumpis    | B60G 7/005 264/242 |
| 4,017,197 | A  | * | 4/1977  | Farrant   | B60G 7/005 403/132 |
| 4,154,546 | A  | * | 5/1979  | Merrick   | B60G 7/005 277/635 |
| 5,154,673 | A  | * | 10/1992 | Fukunaga  | F16H 55/563 474/13 |
| 5,772,337 | A  | * | 6/1998  | Maughan   | F16C 11/0638 384/206 |
| 6,076,840 | A  | * | 6/2000  | Kincaid   | F16F 1/3842 267/188 |
| 6,550,120 | B1 | * | 4/2003  | Maughan   | B23G 5/062 29/271 |
| 8,757,648 | B1 | * | 6/2014  | Winter    | B60G 7/001 280/124.134 |
| 8,967,868 | B2 | * | 3/2015  | Wright    | F16C 11/0642 384/208 |

(Continued)

*Primary Examiner* — Drew J Brown
(74) *Attorney, Agent, or Firm* — Robert L. Stearns; Dickinson Wright, PLLC

(57) ABSTRACT

The ball joint assembly includes a housing that has an inner wall which surrounds an open bore that extends along a central axis. The ball joint assembly further includes a ball stud with a ball portion that is received in the open bore of the housing and with a shank portion that projects out of the open bore through an open end of the housing. At least one bearing is also disposed in the open bore. The at least one bearing has a curved bearing surface which is in slidable contact with the ball portion of the ball stud for allowing the ball stud and the housing to rotate and articulate relative to one another. The bearing is made as a single, monolithic piece of nylon 4/6.

15 Claims, 4 Drawing Sheets

(56) References Cited

U.S. PATENT DOCUMENTS

| | | | |
|---|---|---|---|
| 9,982,711 B1* | 5/2018 | Henriksen | F16C 11/0642 |
| 2002/0074761 A1* | 6/2002 | Kincaid | B60G 7/005 |
| | | | 280/124.152 |
| 2004/0071501 A1* | 4/2004 | Ureach | B60G 7/005 |
| | | | 403/135 |
| 2005/0047851 A1* | 3/2005 | Molenaar | B60G 7/005 |
| | | | 403/122 |
| 2009/0238636 A1* | 9/2009 | Howe | F16C 11/069 |
| | | | 403/127 |
| 2011/0135381 A1* | 6/2011 | Wilcutt | B60G 7/005 |
| | | | 403/122 |
| 2014/0086667 A1* | 3/2014 | Elterman | F16C 11/0633 |
| | | | 403/122 |
| 2014/0131970 A1* | 5/2014 | Kuroda | F16C 11/0657 |
| | | | 280/124.107 |
| 2014/0205366 A1* | 7/2014 | Mevorach | B60G 7/005 |
| | | | 403/144 |

* cited by examiner

BALL JOINT ASSEMBLY

BACKGROUND OF THE INVENTION

1. Field of the Invention

The present invention relates generally to ball and socket assemblies and more particularly to ball joints for the suspension systems of high performance vehicles, such as race cars.

2. Related Art

Vehicle steering and suspension assemblies typically include multiple ball joint assemblies for interconnecting the various components with one another. Each such ball joint assembly has a housing with an open bore and a stud which is partially disposed in the open bore and extends outwardly therefrom. One or more bearings are interposed in the open bore between the housing and stud. The housing and stud are fixed with different steering or suspension components. The bearings are typically made out of either plastic or metal.

In most vehicles, the ball joint assemblies are not exposed to extreme temperatures. However, in some high performance vehicles, such as certain race cars, the ball joint assemblies are located in very close proximity to other vehicle components, such as brake rotors and/or brake calipers, that operate at extreme temperatures for an extended period of time. In those ball joint assemblies, metal bearings are employed to perform in those extreme conditions.

SUMMARY OF THE INVENTION AND ADVANTAGES

One aspect of the present invention is related to a ball joint assembly which includes a housing that has an inner wall. The inner wall of the housing surrounds an open bore that extends along a central axis. The ball joint assembly further includes a ball stud with a ball portion that is received in the open bore of the housing and with a shank portion that projects out of the open bore through an open end of the housing. At least one bearing is also disposed in the open bore. The at least one bearing has a curved bearing surface which is in slidable contact with the ball portion of the ball stud for allowing the ball stud and the housing to rotate and articulate relative to one another. The bearing is made as a single, monolithic piece of nylon 4/6.

The use of nylon 4/6 for the bearing has unexpectedly been found to provide the ball joint assembly with superior performance in a high performance vehicle's suspension system as compared to other bearing materials. Specifically, bearings of nylon 4/6 have been found to provide optimal ball stud torque and exceptional wear resistance over a very long operating life, even at extreme temperatures. Additionally, the use of nylon 4/6 rather than metal for the bearing results in a reduction in the total mass of the ball joint assembly which is particularly advantageous in motorsports applications because it allows for improved handling and acceleration in the vehicle. Because this mass reduction occurs in the ball joints, which are considered "unsprung weight", the mass reduction is particularly advantageous. Specifically, it is known that a reduction in unsprung mass is equivalent to many times that in sprung mass. Therefore, because a vehicle includes a number of ball joint assemblies, the mass reduction of in each bearing of each ball joint assembly provides appreciable value in a professional racing where races often last hours and are often won by tenths of a second.

According to another aspect of the present invention, the housing has an outer surface that is shaped to be received into an opening of a control arm.

According to yet another aspect of the present invention, the ball joint assembly further includes a spring which is compressed to preload the curved bearing surface of the bearing against the ball portion of the ball stud.

According to still another aspect of the present invention, the spring is a Belleville washer.

According to a further aspect of the present invention, a cover plate is secured with the housing to capture the ball portion of the ball stud and the bearing in the open bore of the housing.

According to yet a further aspect of the present invention, only a single bearing is disposed in the open bore of the housing.

According to still a further aspect of the present invention, the curved bearing surface of the bearing is a first curved bearing surface and is in slidable contact with one hemisphere of the ball portion of the ball stud, and the inner wall of the housing presents a second curved bearing surface that is in slidable contact with an opposite hemisphere of the ball portion of the ball stud.

Another aspect of the present invention is for a vehicle suspension system for a performance vehicle. The suspension system includes at least one control arm, a tie rod end and a knuckle, which supports a hub and a brake rotor. Ball joint assemblies operably connect the knuckle with the at least one control arm and with the tie rod end. The ball joint assemblies are in close proximity to the brake rotor, and each ball joint assembly includes a housing with an inner wall which surrounds an open bore that extends along a central axis. Each ball joint assembly also includes a ball stud with a ball portion that is received in the open bore of the housing and a shank portion that projects out of the open bore through an open end of the housing. A bearing is disposed in each of the open bores and has a curved bearing surface which is in slidable contact with the ball portion of the ball stud for allowing the ball stud and the housing to rotate and articulate relative to one another. The bearings are made of single monolithic pieces of nylon 4/6.

Another aspect of the present invention is for a method of making a ball joint assembly. The method includes the step of injection molding a single piece bearing that has a curved bearing surface out of nylon 4/6. The method continues with the step of inserting the bearing into the open bore of a housing that has an inner wall. The method proceeds with the step of inserting a ball portion of a ball stud into the open bore such that the curved bearing surface of the bearing is in slidable contact with the ball portion of the ball stud for allowing the ball stud and housing to rotate and articulate relative to one another.

According to another aspect of the present invention, the method further includes the step of inserting the housing into a control arm of a vehicle suspension system.

According to yet another aspect of the present invention, the method further includes the step of inserting a spring into the open bore to bias the curved bearing surface of the bearing against the ball portion of the ball stud.

According to still another aspect of the present invention, the method further includes the step of closing an open end of the housing to trap the bearing and the ball portion of the ball stud in the open bore.

BRIEF DESCRIPTION OF THE DRAWINGS

These and other aspect, features and advantages of the invention will become more readily appreciated when considered in connection with the following detailed description of the presently preferred embodiment and best mode, appended claims and accompanying drawings, in which:

DESCRIPTION OF THE ENABLING EMBODIMENT

Figure 1:
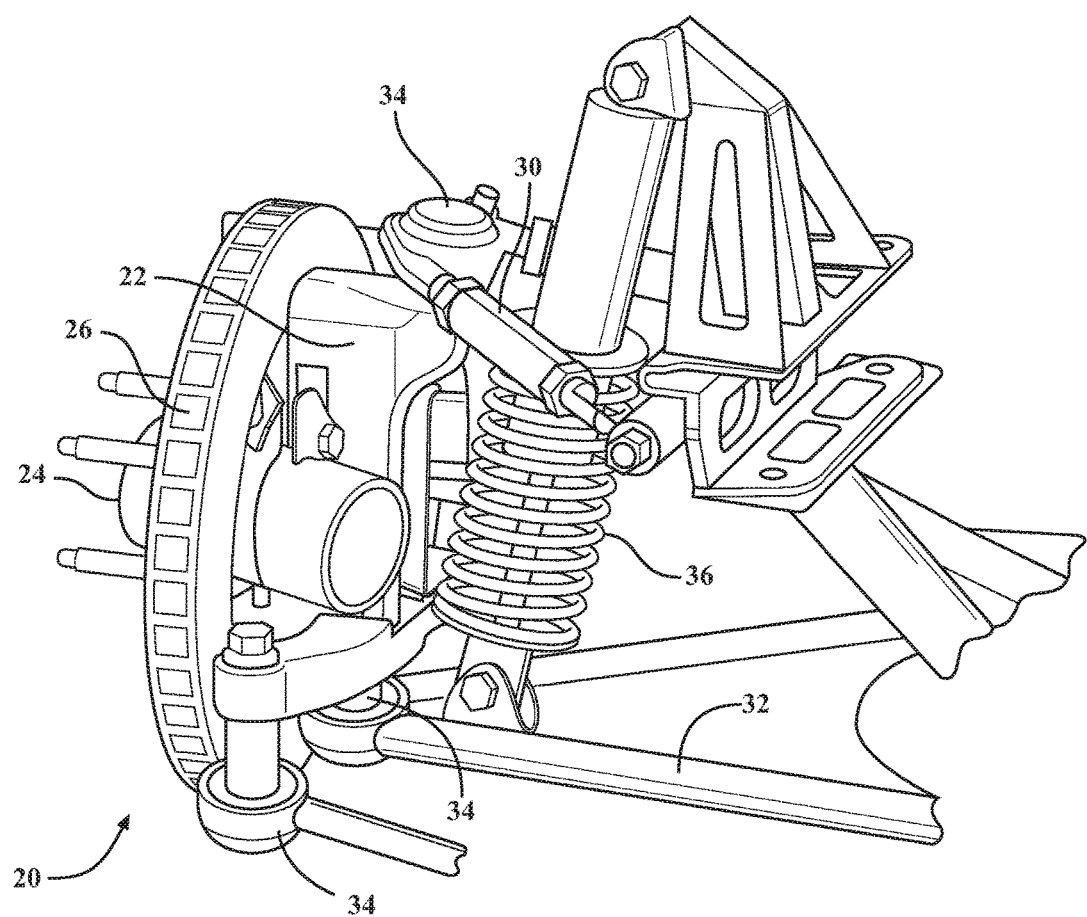
FIG. 1 is a perspective view of an exemplary embodiment of a suspension system for a high performance vehicle.
Figure 2:
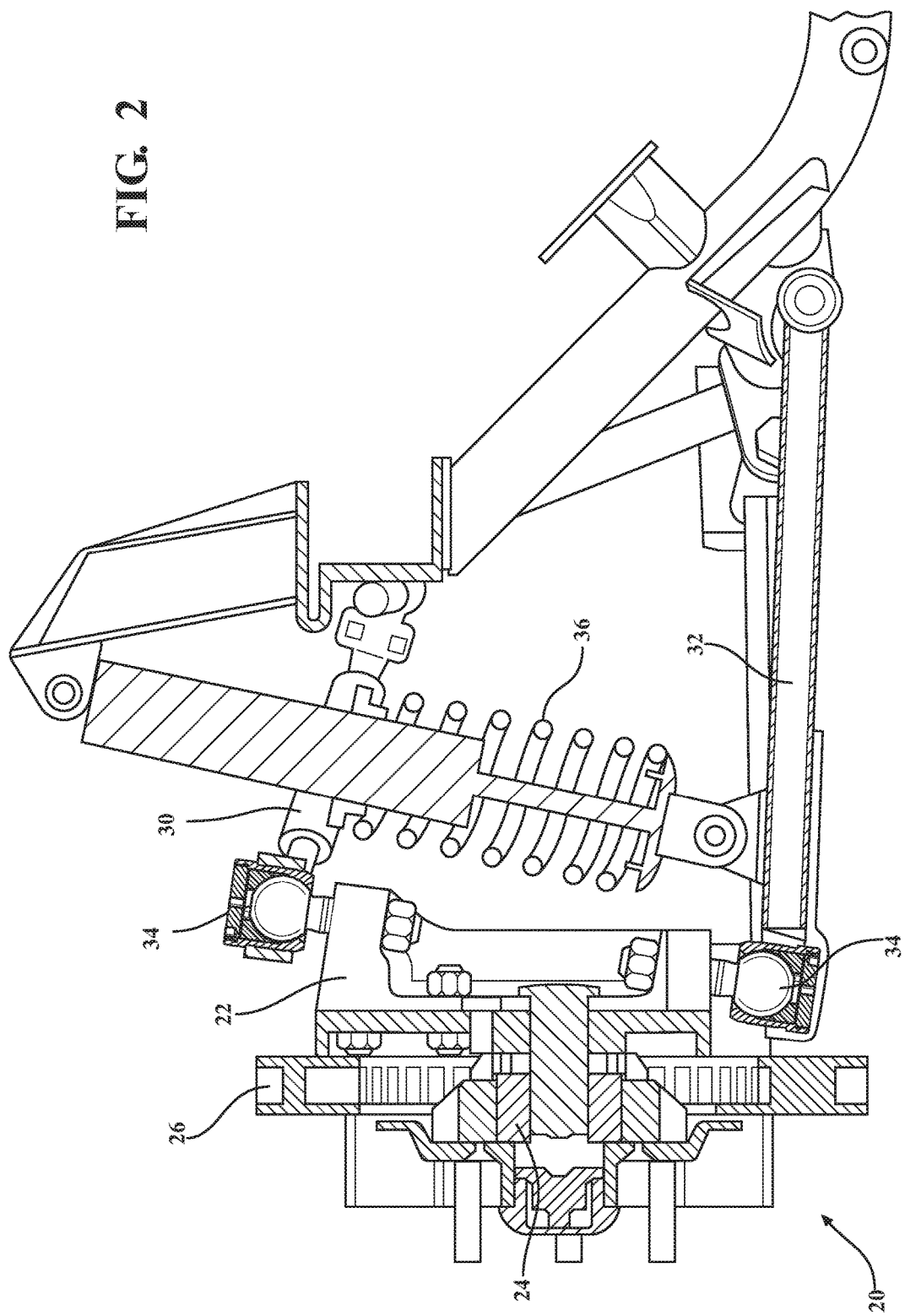
FIG. 2 is a cross-sectional view of the vehicle suspension system of FIG. 1.

Referring to the Figures, wherein like numerals indicate corresponding parts throughout the several views, a double wishbone-type vehicle suspension system 20 for a high performance vehicle is generally shown. As shown in FIGS. 1 and 2, the vehicle suspension system 20 includes a knuckle 22 which rotatably supports a wheel hub 24 and a brake rotor 26 and also supports a brake caliper which contains a pair of brake pads (not shown). The vehicle suspension system 20 also includes a tie rod end 28, an upper control arm 30 and a lower control arm 32 that are operably connected with the knuckle 22 via ball joint assemblies 34. The suspension system also includes a strut assembly with a damper and a coil spring 36.

As shown, the ball joint assemblies 34 are received in openings of the ends of the upper and lower control arms 30, 32, and the housings 38 are positioned in very close proximity to the brake rotor 26 without any components positioned therebetween. During operation of the vehicle, the brake rotor 26 gets extremely hot which, in turn, heats the ball joint assemblies 34.

Figure 3:
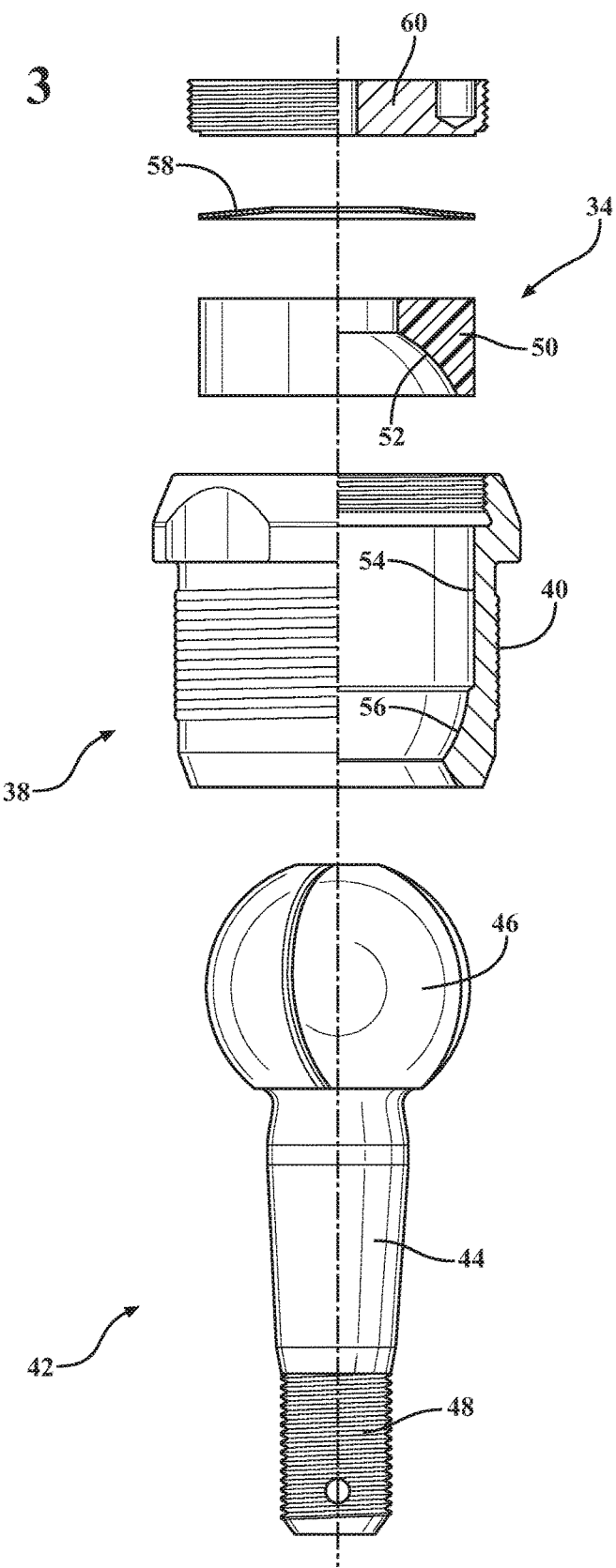
FIG. 3 is an exploded and cross-sectional view of a ball joint assembly for the suspension system shown in FIGS. 1 and 2.
Figure 4:
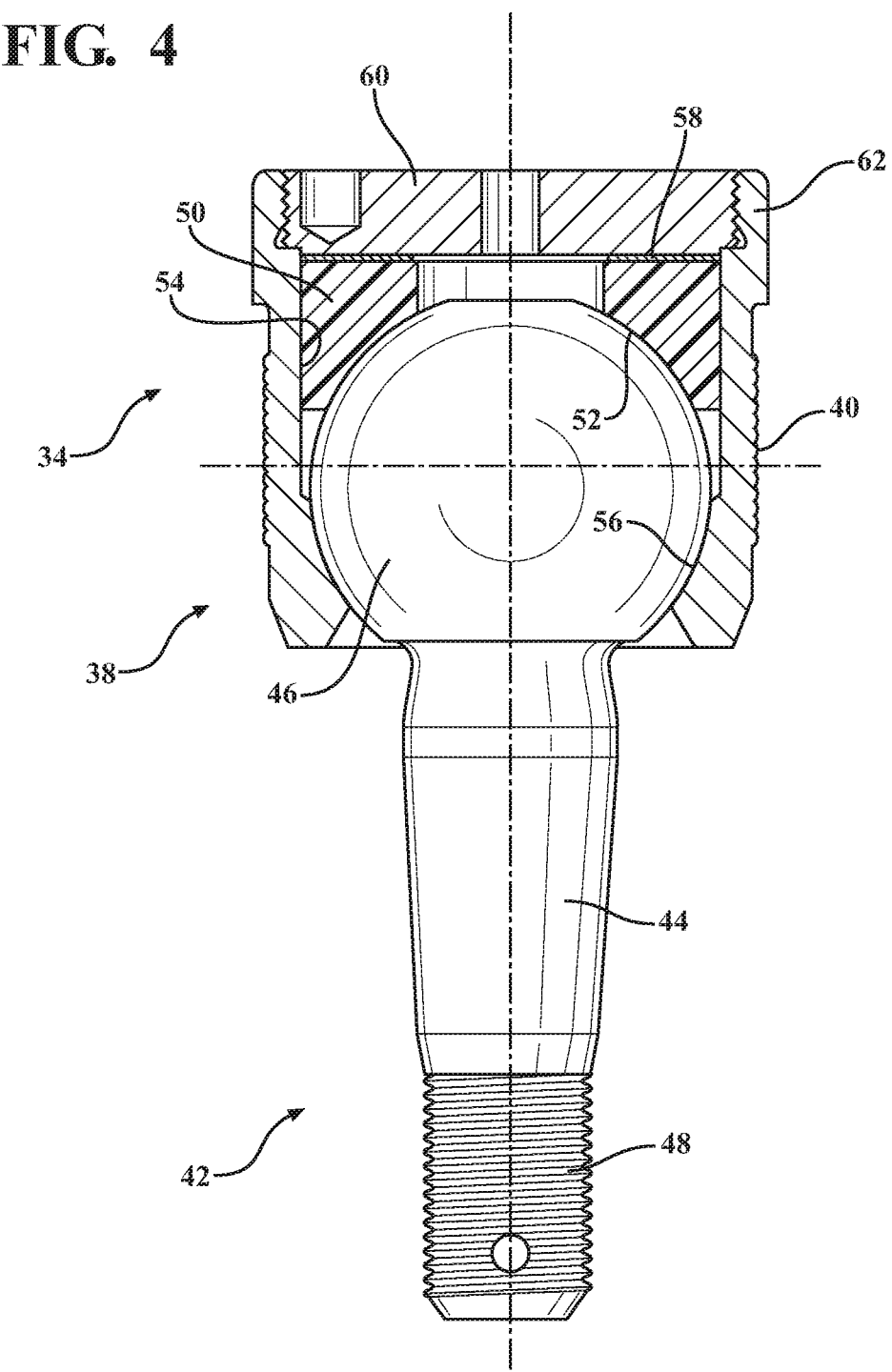
FIG. 4 is a cross-sectional and assembled view of the ball joint assembly of FIG. 3.

Referring additionally to FIGS. 3 and 4, each of the ball joint assemblies 34 has a housing 38 with an open bore that extends along an axis between opposite open ends and an outer wall 40. The outer wall 40 is threaded to operably connect the housing 38 with one of the control arms 30, 32. The ball joint assembly 34 also includes a ball stud 42 with a shank portion 44 and a ball portion 46. The ball portion 46 has a semi-spherical shape and is received in the open bore of the housing 38 such that the shank portion 44 projects out of the open bore through one of the open ends. The shank portion 44 has a threaded end 48 for receiving a nut to secure the ball joint assembly 34 with the knuckle 22.

Each of the ball joint assemblies 34 also includes at least one bearing 50 which has a first curved bearing surface 52 that has a radius of curvature which is similar to a radius of curvature of the ball portion 46 of the ball stud 42 such that the first curved bearing surface 52 is in surface-to-surface and slidable contact with one hemisphere of an outer surface of the ball portion 46. The inner wall 54 of the housing 38 presents a second curved bearing surface 56 which also has a similar radius of curvature to the ball portion 46 and is in surface-to-surface and slidable contact with an opposite hemisphere of the outer surface of the ball portion 46. During operation of the vehicle, the first and second curved bearing surfaces 52, 56 allow the ball stud 42 and housing 38 to rotate and articulate relative to one another.

A spring 58 is disposed in the open bore of the housing 38 between the bearing 50 and a cover plate 60 which closes the open end of the housing 38 opposite of the shank portion 44 of the ball stud 42. The spring 58 is compressed to apply a biasing force on the bearing 50, thereby preloading the first curved bearing surface 52 against the ball portion 46 of the ball stud 42. This allows the bearing 50 to remain in contact with the ball stud 42 as these components wear to prevent impacting, which can rapidly accelerate wear of the bearing 50 and ball stud 42, during the operating life of the ball joint assembly 34. In the exemplary embodiment, the spring 58 is a Belleville washer 58. However, it should be appreciated that any suitable type of compression spring may be employed. It should also be appreciated that the ball joint assembly could be constructed without a spring.

In the exemplary embodiment, the cover plate 60 is threadedly engaged with the inner wall 54 of the housing 38, and a set screw 62 extends through the housing 38 and into the cover plate 60 to ensure that the cover plate 60 is threaded to the correct location and to prevent unintentional unthreading of the cover plate 60. The set screw 62 also ensures that the spring 58 is compressed by a proper amount to apply a desired biasing force on the bearing 50.

The bearing 50 is made as a single monolithic piece of nylon 4/6 which is made through an injection molding operation. The use of nylon 4/6 has unexpectedly been found to provide the bearing 50 with exceptional durability when operating in close proximity to the brake rotor 26 during a motorsport race. The nylon 4/6 material may further include reinforcing fibers, such as carbon or glass fibers to further improve the durability and operating life of the bearing 50. Alternately, the bearing could have a snap-on connection wherein the nylon 4/6 bearing includes deflectable arms that snap into engagement with the ball portion of the ball stud such that the curved bearing surface of a single piece bearing is in slidable contact with both hemispheres of the ball portion.

Another aspect of the present invention is related to a method of making a ball joint assembly 34, such as the ball joint assembly 34 shown in FIGS. 3 and 4. The exemplary method includes the step of injection molding the bearing 50 out of nylon 4/6. The method proceeds with the step of inserting the ball portion 46 of the ball stud 42 into the open bore of the housing 38 such that the outer surface of the ball portion 46 is in surface-to-surface and slidable contact with the curved second bearing 50 surface of the inner wall 54 of the housing 38. The method proceeds with the step of inserting the bearing 50 into the inner bore of the housing 38 such that the first curved bearing surface 52 is in surface-to-surface and slidable contact with the outer surface of the ball portion 46. The method continues with the step of inserting the spring 58 into the open bore such that the spring 58 directly contacts a flat upper surface of the bearing 50. The method proceeds with the step of threading the cover plate 60 onto the inner wall 54 of the housing 38 to capture the spring 58, bearing 50 and ball portion 46 in the inner bore of the housing 38 and to preload the spring 58. The exemplary method further includes the step of inserting the housing 38 of the ball joint assembly 34 into an opening at an end of either an upper control arm 30 or a lower control arm 32 or a tie rod end 28 of a vehicle suspension system 20 such that the ball joint assembly 34 is in close proximity to a brake rotor 26.

Obviously, many modifications and variations of the present invention are possible in light of the above teachings and may be practiced otherwise than as specifically described while within the scope of the appended claims.

Additionally, it is to be understood that all features of all claims and all embodiments can be combined with each other, as long as they do not contradict each other.

What is claimed is:

1. A ball joint assembly, comprising:
    a housing including an inner wall which surrounds an open bore that extends along a central axis;
    a ball stud with a ball portion that is received in said open bore of said housing and with a shank portion projecting out of said open bore through an open end of said housing;
    a bearing disposed in said open bore and having a curved bearing surface which is in slidable contact with said ball portion of said ball stud for allowing said ball stud and said housing to rotate and articulate relative to one another; and
    said bearing being made of a single monolithic piece of nylon 4/6.

2. The ball joint assembly as set forth in claim 1 wherein said housing has an outer surface that is shaped to be received in an opening of a control arm.

3. The ball joint assembly as set forth in claim 1 further including a spring which is compressed to preload said curved bearing surface of said bearing against said ball portion of said ball stud.

4. The ball joint assembly as set forth in claim 3 wherein said spring is a Belleville washer.

5. The ball joint assembly as set forth in claim 1 further including a cover plate secured with said housing and capturing said ball portion of said ball stud and said bearing in said open bore of said housing.

6. The ball joint assembly as set forth in claim 1 wherein only a single bearing is disposed in said open bore of said housing.

7. The ball joint assembly as set forth in claim 6 wherein said curved bearing surface of said bearing is a first curved bearing surface and is in slidable contact with one hemisphere of said ball portion of said ball stud and wherein said inner wall of said housing presents a second curved bearing surface that is in slidable contact with another hemisphere of said ball portion of said ball stud.

8. A vehicle suspension system for a performance vehicle, comprising:
    at least one control arm and a tie rod end;
    a knuckle supporting a hub and a brake rotor;
    ball joint assemblies operably connecting said knuckle with said at least one control arm and said tie rod end, said ball joint assemblies being in close proximity to said brake rotor; and
    each of said ball joint assemblies including;
    a housing including an inner wall which surrounds an open bore that extends along a central axis,
    a ball stud with a ball portion that is received in said open bore of said housing and with a shank portion projecting out of said open bore through an open end of said housing,
    a bearing disposed in said open bore and having a curved bearing surface which is in slidable contact with said ball portion of said ball stud for allowing said ball stud and said housing to rotate and articulate relative to one another, and
    said bearing being made of a single monolithic piece of nylon 4/6.

9. The suspension system as set forth in claim 8 wherein each of said ball joint assemblies further includes a spring which is compressed to preload said curved bearing surface of said bearing against said ball portion of said ball stud.

10. The suspension system as set forth in claim 8 wherein said spring is a Belleville washer.

11. The suspension system as set forth in claim 8 further including a cover plate secured with said housing and capturing said ball portion of said ball stud and said bearing in said open bore of said housing.

12. A method of making a ball joint assembly, comprising the steps of:
    injection molding a single piece bearing that has a curved bearing surface out of nylon 4/6; inserting the bearing into an open bore of a housing that has an inner wall; and
    inserting a ball portion of a ball stud into the open bore such that the curved bearing surface of the bearing is in slidable contact with the ball portion of the ball stud for allowing the ball stud and housing to rotate and articulate relative to one another.

13. The method of making a ball joint assembly as set forth in claim 12 further including the step of inserting the housing into a control arm of a vehicle suspension system.

14. The method of making a ball joint assembly as set forth in claim 12 further including the step of inserting a spring into the open bore of the housing to bias the curved bearing surface of the bearing against the ball portion of the ball stud.

15. The method of making a ball joint assembly as set forth in claim 12 further including the step of closing an open end of the housing to trap the bearing and the ball portion of the ball stud in the open bore.

* * * * *